(12) United States Patent
Rajput et al.

(10) Patent No.: US 11,863,518 B2
(45) Date of Patent: Jan. 2, 2024

(54) METHODS, SYSTEMS, AND COMPUTER READABLE MEDIA FOR AUTOMATIC DOMAIN NAME SYSTEM (DNS) CONFIGURATION FOR 5G CORE (5GC) NETWORK FUNCTIONS (NFS) USING NF REPOSITORY FUNCTION (NRF)

(71) Applicant: Oracle International Corporation, Redwood Shores, CA (US)

(72) Inventors: Jay Rajput, Bangalore (IN); Amarnath Jayaramachar, Bangalore (IN); Virendra Singh, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/534,904

(22) Filed: Nov. 24, 2021

(65) Prior Publication Data

US 2023/0164109 A1    May 25, 2023

(51) Int. Cl.
*H04L 41/5054* (2022.01)
*H04L 41/50* (2022.01)
(Continued)

(52) U.S. Cl.
CPC ...... *H04L 61/4511* (2022.05); *H04L 41/5054* (2013.01); *H04L 41/5058* (2013.01); *H04L 61/10* (2013.01); *H04L 61/5076* (2022.05)

(58) Field of Classification Search
CPC ............. H04L 61/4511; H04L 41/5054; H04L 41/5058; H04L 61/10; H04L 61/5076; H04L 61/58
See application file for complete search history.

(56) References Cited

U.S. PATENT DOCUMENTS 10,205,701 B1    2/2019    Voss et al.
10,375,016 B1    8/2019    Vavrusa et al.
(Continued)

FOREIGN PATENT DOCUMENTS

KR          101097706 B1 *  12/2011   ............ H04W 80/10
WO    WO 2023/096785 A1      6/2023

OTHER PUBLICATIONS

D. Chandramouli, T. Sun, "3rd Generation Partnership Project; Technical Specification Group Services and System Aspects; System architecture for the 5G System (5GS); Stage 2 (Release 17)," 3GPP TS 23.501, V17.2.0, pp. 1-542 (Sep. 2021). (Year: 2021).*

(Continued)

*Primary Examiner* — Dhairya A Patel
*Assistant Examiner* — Alex H. Tran
(74) *Attorney, Agent, or Firm* — Jenkins, Taylor & Hunt, P.A.

(57) ABSTRACT

A method for automatic domain name system (DNS) configuration for 5G core (5GC) network functions (NFs) includes, at an NF repository function (NRF) including at least one processor, receiving a message concerning a 5GC network function. The method further includes determining a first DNS resource record parameter for the 5GC NF. The method further includes determining a second DNS resource record parameter for the 5GC NF. The method further includes automatically configuring a DNS with a mapping between the first and second DNS resource record parameters for the 5GC NF.

19 Claims, 8 Drawing Sheets

(51) Int. Cl.
*H04L 61/10* (2022.01)
*H04L 61/4511* (2022.01)
*H04L 61/5076* (2022.01)

(56) References Cited

U.S. PATENT DOCUMENTS

| | | |
|---|---|---|
| 10,785,166 B1 | 9/2020 | Rothschild et al. |
| 10,887,276 B1 | 1/2021 | Parulkar et al. |
| 11,005,949 B1 | 5/2021 | Baturin et al. |
| 11,025,589 B1 | 6/2021 | Muscariello et al. |
| 11,038,840 B1 | 6/2021 | Vettaikaran et al. |
| 11,095,534 B1 | 8/2021 | Dunsmore et al. |
| 11,271,894 B1 | 3/2022 | McCarty et al. |
| 11,652,782 B1 | 5/2023 | Goel |
| 2018/0191666 A1 | 7/2018 | Rahman et al. |
| 2019/0044980 A1 | 2/2019 | Russell et al. |
| 2019/0081924 A1 | 3/2019 | White et al. |
| 2019/0097965 A1 | 3/2019 | Linari et al. |
| 2019/0238498 A1 | 8/2019 | Cleary et al. |
| 2019/0306111 A1 | 10/2019 | Tang et al. |
| 2020/0084178 A1 | 3/2020 | Dreyer |
| 2020/0329008 A1* | 10/2020 | Dao ............... G06F 16/953 |
| 2020/0382584 A1 | 12/2020 | Basavaiah et al. |
| 2020/0403911 A1 | 12/2020 | Singhal et al. |
| 2021/0021634 A1 | 1/2021 | Babakian et al. |
| 2021/0067480 A1* | 3/2021 | Goel ............... H04L 61/106 |
| 2021/0092088 A1 | 3/2021 | Ramachandran et al. |
| 2021/0099415 A1 | 4/2021 | Kanagarathinam et al. |
| 2021/0126892 A1 | 4/2021 | Maskara et al. |
| 2021/0168127 A1 | 6/2021 | Jensen et al. |
| 2021/0203631 A1 | 7/2021 | Uchikawa |
| 2021/0250411 A1 | 8/2021 | Cakulev et al. |
| 2021/0258766 A1* | 8/2021 | Watanabe ........... H04W 48/16 |
| 2021/0282078 A1 | 9/2021 | Martinez De La Cruz et al. |
| 2021/0306875 A1 | 9/2021 | Zhang |
| 2021/0321245 A1* | 10/2021 | Landais ............. H04W 8/06 |
| 2021/0328967 A1 | 10/2021 | Albrecht et al. |
| 2021/0351993 A1* | 11/2021 | Puente Pestaña ..... H04L 41/046 |
| 2021/0385286 A1* | 12/2021 | Wang ............... H04L 61/4541 |
| 2021/0392197 A1 | 12/2021 | Yang et al. |
| 2021/0400010 A1 | 12/2021 | Uchikawa |
| 2022/0006726 A1 | 1/2022 | Michael et al. |
| 2022/0014939 A1 | 1/2022 | Colom Ikuno et al. |
| 2022/0030649 A1 | 1/2022 | Popescu et al. |
| 2022/0052961 A1 | 2/2022 | Chauhan et al. |
| 2022/0116381 A1 | 4/2022 | Bosch et al. |
| 2022/0131830 A1 | 4/2022 | Dodd-Noble et al. |
| 2022/0132358 A1 | 4/2022 | Peng et al. |
| 2022/0191100 A1 | 6/2022 | Kim et al. |
| 2022/0200847 A1 | 6/2022 | Bartolome Rodrigo et al. |
| 2022/0239696 A1 | 7/2022 | Konda et al. |
| 2022/0256040 A1 | 8/2022 | Kahn |
| 2023/0164110 A1 | 5/2023 | Goel |

OTHER PUBLICATIONS

P. Wild, "3rd Generation Partnership Project; Technical Specification Group Core Network and Terminals; Numbering, addressing and identification; (Release 17)," 3GPP TS 23.003, V17.3.0, pp. 1-145 (Sep. 2021). (Year: 2021).*

"3rd Generation Partnership Project; Technical Specification Group Core Network and Terminals; Domain Name System Procedures; Stage 3 (Release 17)," 3GPP TS 29.303, V17.1.0, pp. 1-82 (Mar. 2021).

"3rd Generation Partnership Project; Technical Specification Group Services and System Aspects; Security architecture and procedures for 5G System (5GS) (Release 17)," 3GPP TS 33.501, V17.3.0, pp. 1-258 (Sep. 2021).

"3rd Generation Partnership Project; Technical Specification Group Services and System Aspects; Procedures for the 5G System (5GS); Stage 2 (Release 17)," 3GPP TS 23.502, V17.2.1, pp. 1-712 (Sep. 2021).

"3rd Generation Partnership Project; Technical Specification Group Core Network and Terminals; 5G System; Technical Realization of Service Based Architecture; Stage 3 (Release 17)," 3GPP TS 29.500, V17.4.0, pp. 1-109 (Sep. 2021).

"3rd Generation Partnership Project; Technical Specification Group Services and System Aspects; System architecture for the 5G System (5GS); Stage 2 (Release 17)," 3GPP TS 23.501, V17.2.0, pp. 1-542 (Sep. 2021).

"3rd Generation Partnership Project; Technical Specification Group Core Network and Terminals; Numbering, addressing and identification; (Release 17)," 3GPP TS 23.003, V17.3.0, pp. 1-145 (Sep. 2021).

"3rd Generation Partnership Project; Technical Specification Group Core Network and Terminals; 5G System; Network Function Repository Services; Stage 3 (Release 17)," 3GPP TS 29.510, V17.3.0 pp. 1-271 (Sep. 2021).

"3rd Generation Partnership Project; Technical Specification Group Core Network and Terminals; 5G System; Session Management Services; Stage 3 (Release 17)," 3GPP TS 29.502, V17.2.0, pp. 1-306 (Sep. 2021).

"3rd Generation Partnership Project; Technical Specification Group Core Network and Terminals; 5G System; Principles and Guidelines for Services Definition; Stage 3 (Release 17)," 3GPP TS 29.501, V17.3.1, pp. 1-78 (Sep. 2021).

Vixie et al., "Dynamic Updates in the Domain Name System (DNS Update)," Network Working Group, Request for Comments 2136, pp. 1-26 (Apr. 1997).

Non-Final Office Action for U.S. Appl. No. 17/534,914 (dated Sep. 1, 2022).

Commonly-Assigned, Co-pending U.S. Appl. No. 17/534,914 for "Methods, Systems, and Computer Readable Media for Dynamically Updating Domain Name System (DNS) Records from Registered Network Function (NF) Profile Information," (Unpublished, filed Nov. 24, 2021).

Notice of Allowance for U.S. Appl. No. 17/534,914 (dated Mar. 9, 2023).

Notification of Transmittal of the International Search Report and the Written Opinion of the International Searching Authority, or the Declaration for International Patent Application No. PCT/US2022/050011 (dated Feb. 6, 2023).

"3rd Generation Partnership Project; Technical Specification Group Core Network and Terminals; 5G System—Phase 1; CT WG4 Aspects (Release 16)", 3GPP TR 29.891, V16.0.0, pp. 1-146 (Jul. 2020).

Nokia, et al., "AMF Discovery by 5G-AN", 3GPP TSG CT WG4 Meeting #86, C4-186486, pp. 1-5 (Aug. 2018).

Notification of Transmittal of the International Search Report and the Written Opinion of the International Searching Authority, or the Declaration for International Patent Application No. PCT/US2022/050010 (dated Feb. 1, 2023).

Notice of Allowance and Fee(s) Due for U.S. Appl. No. 17/534,914 (dated Jan. 24, 2023).

Corrected Notice of Allowability for U.S. Appl. No. 17/534,914 (dated Apr. 18, 2023).

* cited by examiner

METHODS, SYSTEMS, AND COMPUTER READABLE MEDIA FOR AUTOMATIC DOMAIN NAME SYSTEM (DNS) CONFIGURATION FOR 5G CORE (5GC) NETWORK FUNCTIONS (NFS) USING NF REPOSITORY FUNCTION (NRF)

TECHNICAL FIELD

The subject matter described herein relates to automatic DNS configuration. More particularly, the subject matter described herein relates to methods, systems, and computer readable media for automatic DNS configuration for 5GC NFs using an NRF.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. The terms "service profiles" and "NF profiles" are used interchangeably herein. Consumer NFs can obtain information about producer NF instances that have registered with the NRF through the NF service discovery procedure. According to the NF service discovery procedure, a consumer NF sends an NF discovery request to the NRF. The NF discovery request includes query parameters that the NRF uses to locate NF profiles of producer NFs capable of providing the service identified by the query parameters. NF profiles are data structures that define the type of service provided by a producer NF instance and well as contact and capacity information regarding the producer NF instance.

In addition to consumer NFs, another type of network node that can invoke the NF service discovery procedure to obtain information about NF service instances is a service communication proxy (SCP). The case where the SCP uses the NF service discovery procedure to obtain information about producer NF instances on behalf of consumer NFs is referred to as delegated discovery. Consumer NFs connect to the service communication proxy, and the service communication proxy load balances traffic among producer NF service instances that provide the required services or directly routes the traffic to the destination producer NF instances. The communications model where consumer NFs communicate with producer NFs via the SCP is referred to as the indirect communications model.

In addition to the SCP, another example of an intermediate proxy that forwards traffic between producer and consumer NFs is the security edge protection proxy (SEPP). The SEPP is the network function used to protect control plane traffic that is exchanged between different 5G public land mobile networks (PLMNs). As such, the SEPP performs message filtering, policing and topology hiding for all application programming interface (API) messages that are transmitted between PLMNs.

One problem that can occur In 5G and other communications networks is that 3GPP standards allow 5G NFs to use self-constructed FQDNs to communicate with each other, and maintaining mappings between self-constructed FQDNs and IP addresses can require manual DNS configuration. A self-constructed FQDN is an FQDN generated by a 5GC network function according to a format defined in 3GPP standards. For example, 3GPP TS 23.003 defines the format for self-constructed FQDNs that 5GC NFs can use to identify each other. In order to communicate with a 5GC NF using a self-constructed FQDN, an NF formats a message and includes the self-constructed FQDN in the message. For the message to reach the target NF, the self-constructed FQDN in the message must be resolved into an IP address via DNS. If DNS records are not kept up to date, a 5G consumer NF seeking to contact a 5G producer NF using a self-constructed FQDN will not be able to determine the correct IP address for communicating with the 5G producer NF. Currently, manual DNS configuration is performed to keep DNS records up-to-date with mappings between self-constructed FQDNs for 5GC NFs and IP addresses. Performing manual DNS configuration to keep the mappings up to date is undesirable, especially in cloud network environments where mappings between self-constructed FQDNs and IP addresses may change frequently. More generally, performing manual DNS configuration for any type of DNS resource record relating to a 5GC NF is undesirable.

Accordingly, in light of these and other difficulties, there exists a need for improved methods, systems, and computer readable media for configuring DNS for 5GC NFs.

SUMMARY

A method for automatic domain name system (DNS) configuration for 5G core (5GC) network functions (NFs), includes, at an NF repository function (NRF) including at least one processor, receiving a message concerning a 5GC network function. The method further includes determining a first DNS resource record parameter for the 5GC NF. The method further includes determining a second DNS resource record parameter for the 5GC NF. The method further includes automatically configuring a DNS with a mapping between the first DNS resource record parameter and the second DNS resource record parameter.

According to another aspect of the subject matter described herein, receiving a message concerning a 5GC NF includes receiving a message including an NF or service profile of the 5GC NF.

According to another aspect of the subject matter described herein, determining the first DNS resource record parameter includes reading a self-constructed fully qualified domain name (FQDN) of the 5GC NF from the NF or service profile of the 5GC NF.

According to another aspect of the subject matter described herein, determining the first DNS resource record parameter includes creating a self-constructed fully qualified domain name (FQDN) from parameters in the NF or service profile of the 5GC NF.

According to another aspect of the subject matter described herein, determining the second DNS record parameter includes reading an IP address from the NF or service profile of the 5GC NF.

According to another aspect of the subject matter described herein, determining the second DNS resource record parameter includes determining that the NF or service profile does not include an IP address and obtaining an IP address from one of a load balancer, a cloud network service registry, and a local DNS.

According to another aspect of the subject matter described herein, determining the first DNS resource record parameter includes reading an NF set fully qualified domain name (FQDN) and an NF instance FQDN from the NF profile of the NF wherein automatically configuring the DNS includes automatically generating a naming authority pointer (NAPTR) record mapping the NF set FQDN to the NF instance FQDN.

According to another aspect of the subject matter described herein, receiving a message including an NF or service profile for the 5GC NF includes receiving an NF register message or an NF update message including the NF or service profile for the 5GC NF.

According to another aspect of the subject matter described herein, the method for automatically configuring DNS includes determining that the mapping between the first DNS resource record parameter and second DNS resource record parameter represents a new mapping or a change in an existing mapping maintained by the DNS for the first and second DNS resource record parameters and automatically configuring the DNS includes automatically configuring the DNS in response to the determination that the mapping between the first and second DNS resource record parameters represents a new mapping or a change to an existing mapping.

According to another aspect of the subject matter described herein, automatically configuring the DNS comprises transmitting a message formatted according to an application programming interface published by the DNS from the NRF to a DNS server including the mapping between the first and second DNS resource record parameters.

According to another aspect of the subject matter described herein, a system for automatic domain name system (DNS) configuration for 5G core (5GC) network functions (NFs) is provided. The system includes a network function (NF) repository function (NRF) including at least one processor. The system further includes a DNS auto updater implemented by the at least one processor for receiving a message concerning a 5GC network function, determining a first DNS resource record parameter for the 5GC NF, determining a second DNS resource record parameter the 5GC NF, and automatically configuring a DNS with a mapping between the first DNS resource record parameter and the second DNS resource record parameter.

According to another aspect of the subject matter described herein, the message concerning a 5GC NF comprises a message that includes an NF or service profile of the 5GC NF.

According to another aspect of the subject matter described herein, the DNS auto updater is configured to determine first DNS resource record parameter by reading a self-constructed fully qualified domain name (FQDN) of the 5GC NF from the NF or service profile of the 5GC NF.

According to another aspect of the subject matter described herein, the DNS auto updater is configured to determine the first DNS resource record parameter by creating a self-constructed fully qualified domain name (FQDN) of the 5GC NF from parameters in the NF or service profile of the 5GC NF.

According to another aspect of the subject matter described herein, the DNS auto updater is configured to determine second DNS resource record parameter by reading an IP address from the NF or service profile of the 5GC NF.

According to another aspect of the subject matter described herein, the DNS auto updater is configured to determine that the NF or service profile does not include an IP address and to determine the second DNS resource record parameter by obtaining an IP address from one of a load balancer, a cloud network service registry, and a local DNS.

According to another aspect of the subject matter described herein, the message including the NF or service profile for the 5GC NF includes an NF register or NF update message including the NF or service profile for the 5GC NF.

According to another aspect of the subject matter described herein, the DNS auto updater is configured to determine the first DNS resource record parameter by reading an NF set fully qualified domain name (FQDN) and an NF instance FQDN from the NF profile of the NF wherein automatically configuring the DNS includes automatically generating a naming authority pointer (NAPTR) record mapping the NF set FQDN to the NF instance FQDN.

According to another aspect of the subject matter described herein, the DNS auto updater automatically configures the DNS by transmitting a message formatted according to an application programming interface (API) published by the DNS from the NRF to a DNS server including the mapping between the first and second DNS resource record parameters.

According to another aspect of the subject matter described herein, one or more non-transitory computer readable media having stored thereon executable instructions that when executed by a processor of a network function (NF) repository function (NRF) control the NRF to perform steps is provided. The steps include receiving a message concerning a 5G core (5GC) network function (NF). The steps further include determining a first DNS resource record parameter for the 5GC NF. The steps further include determining a second DNS resource record parameter the 5GC NF. The steps further include automatically configuring a DNS with a mapping between the first and second DNS resource record parameters for the 5GC NF.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
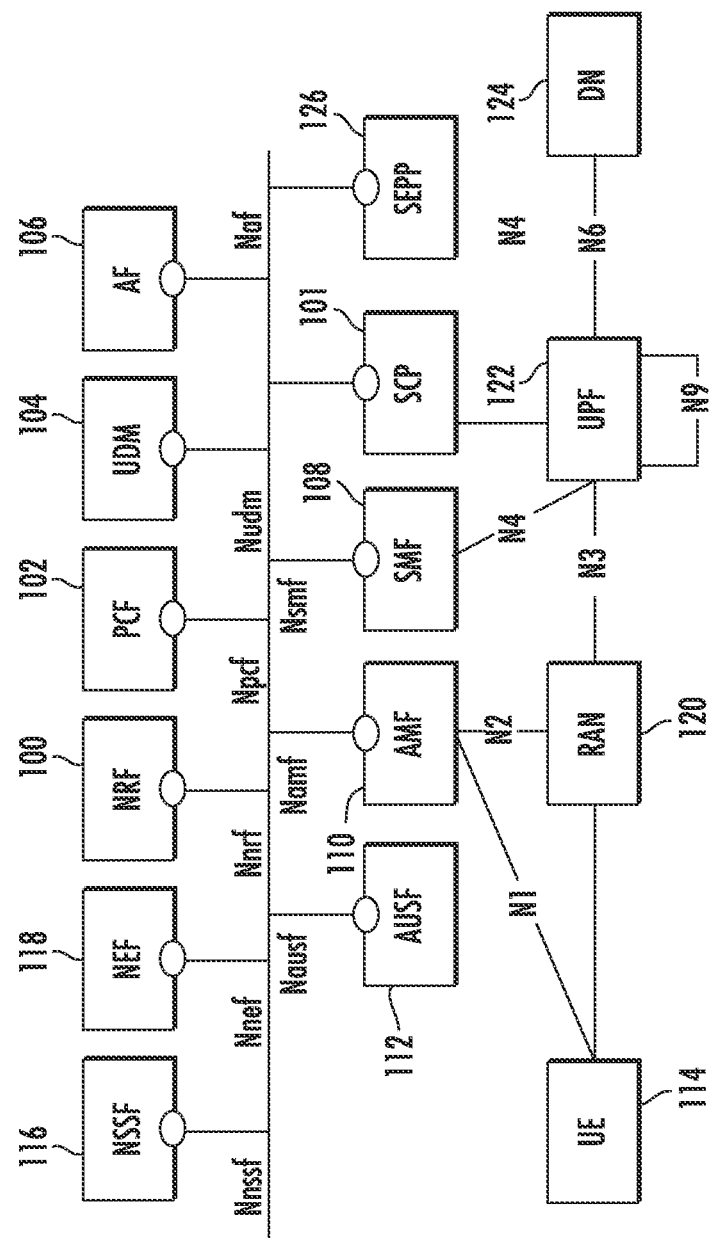
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs.

NRF 100 is a repository for NF or service profiles of producer NF instances. In order to communicate with a producer NF instance, a consumer NF or an SCP must obtain the NF or service profile of the producer NF instance from NRF 100. The NF or service profile is a JavaScript object notation (JSON) data structure defined in 3GPP TS 29.510. The NF or service profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management (UDM) 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

As stated above, one problem that can occur in 5G and other networks is that mappings between self-constructed FQDNs and IP addresses and other types of DNS mappings for 5GC NFs are maintained using manual DNS configuration. The 3GPP has defined self-constructed FQDNs for 5G NFs which are utilized when the consumer cannot perform the discovery of such producer NFs from the NRF. Example use cases for self-constructed FQDNs include NFs that communicate with an NRF without local configuration for NF discovery, communications from a V-NRF to an H-NRF, communications from a V-NSSF to an H-NSSF, AMF to NSSF communications, etc. One challenge with self-constructed FQDNs is the need for manual configuration of DNS. Further, the self-constructed FQDN and IP address mappings at DNS need to be kept in sync with an ever changing cloud native 5G topology. The cloud native 5G topology information is already present at the NRF. However, there is no defined mechanism to sync the topology maintained by the NRF with the DNS system. According to the subject matter described herein, the NRF can be utilized to configure and update DNS with changes in mappings between self-constructed FQDNs and IP addresses and other types of DNS mappings, even in the cloud native 5G topology where the mappings change frequently.

Figure 2:
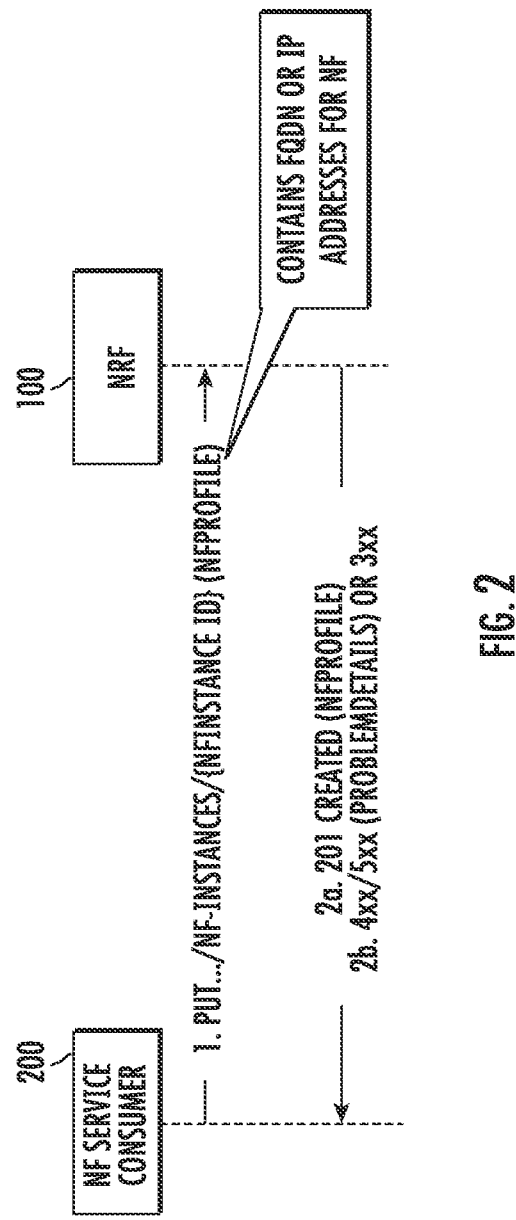
FIG. 2 is a message flow diagram illustrating exemplary messages exchanged for an NF register service operation.

In 5G communications networks, 5GC NFs register their NF profiles with the NRF. The NF profile can include the self-constructed FQDN of the NF, the IP address of the NF, or both. FIG. 2 is a message flow diagram illustrating exemplary messages exchanged for an NF register service operation. Referring to FIG. 2, in line 1 of the message flow, consumer NF 200 initiates the NF register service operation by sending a hypertext transfer protocol (HTTP) PUT message to NRF 100. The HTTP PUT message includes the NF profile of the consumer NF 200. The NF profile can include the FQDN, the IP address, or both for the NF whose NF profile is being registered with NRF 100. If the NF register operation is successful, NRF 100 responds as indicated in line 2a with a 201 Created message. If the NF register service operation is not successful or if the message is redirected to another NRF, NRF 100 responds as indicated in line 2b with a 4XX or 5XX message with problem details or a 3XX message indicating redirection. Once the NRF has the NF profile of the consumer NF, the NRF can use the information in the NF profile to configure DNS with a mapping between the self-constructed FQDN and the IP address. However, current 3GPP standards do not define such a procedure for the NRF to maintain DNS records for 5GC NFs.

Figure 3:
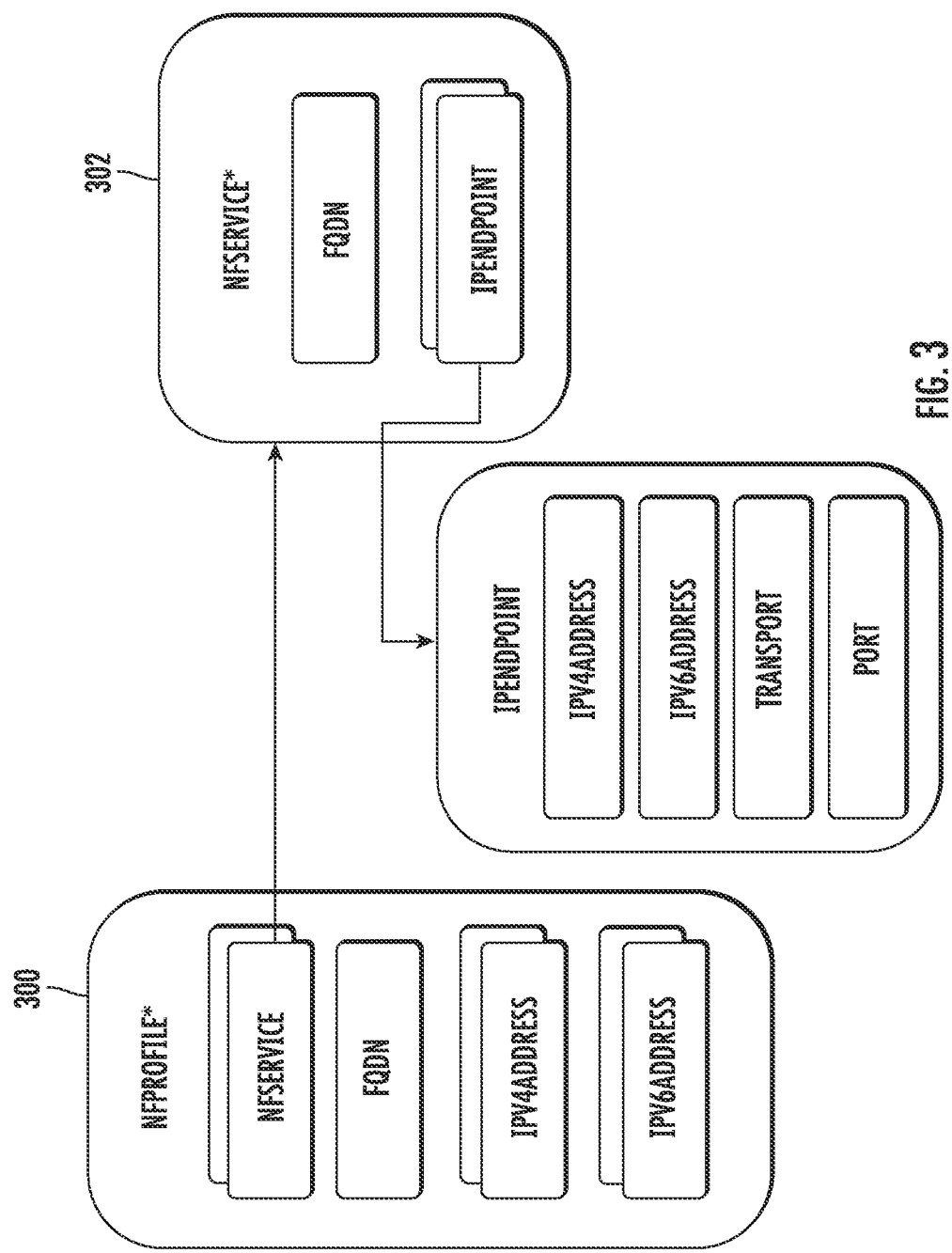
FIG. 3 is a block diagram illustrating exemplary attributes that may be included in an NF profile and an NF service profile.

As indicated above, the NF profile for a 5GC NF can include the self-constructed FQDN for a 5GC NF, the IP address, or both. FIG. 3 is a block diagram illustrating exemplary attributes that may be included in an NF profile and an NF service profile. 5GC NFs register NF profiles with the NRF if the scheme in the URI portion of the FQDN does not require transport layer security (TLS). 5GC NFs register service profiles with the NRF if the scheme in the URI of the FQDN is HTTPS, which requires TLS. In the illustrated example, NF profile 300 includes FQDN, IPv4 address, and IPv6 address attributes. Service profile 302 includes an FQDN attribute and an IP endpoint attribute that includes an IPv4 address or an IPv6 address. Any of these parameters or attributes from the service profile or the NF profile can be used to automatically configure DNS for a 5GC NF.

Self-constructed FQDNs can be created by 5GC NFs according to the format specified in 3GPP TS 23.003. Section 28 of 3GPP TS 23.003 defines self-constructed FQDNs for the following:

N3 inter-working function (N3IWF)
PLMN level NRF and H-NRF
NSSF
AMF
TAI (Tracking Area Identifier FQDN)
AMF set
AMF instance
SMF set
short message service function (SMSF).

An example of a self-constructed FQDN for an NRF is:
https://nrf.5gc.mnc345.mcc012.3gppnetwork.org/
An example of a self-constructed FQDN for an NSSF is:
https://nssf.5gc.mnc345.mcc012.3gppnetwork.org/

One point to highlight is that DNS needs to be configured and kept up-to-date with IP address mappings for self-constructed FQDNs so that consumer NFs that use self-constructed FQDNs can obtain a current IP address for a self-constructed FQDN.

Figure 4:
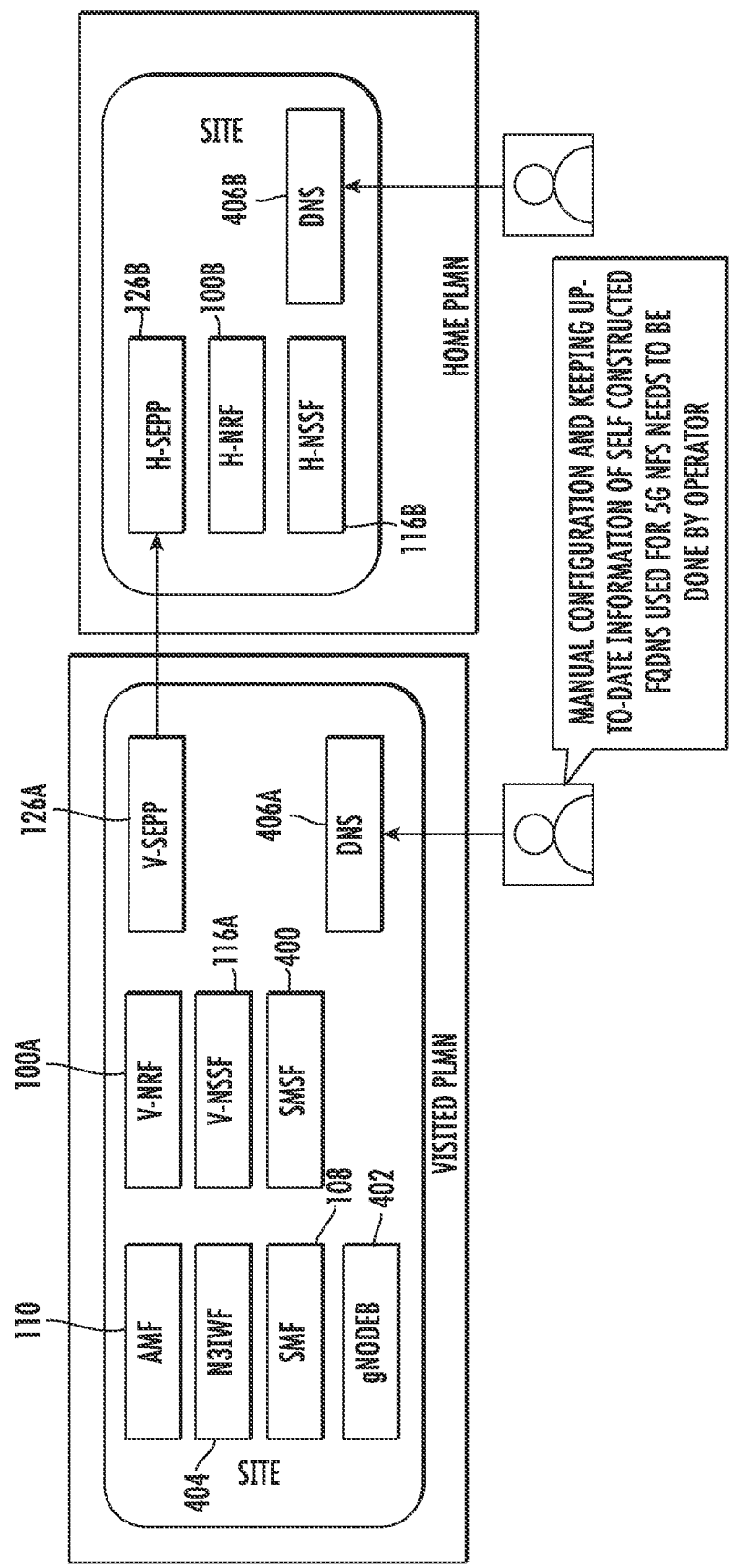
FIG. 4 is a network diagram illustrating an exemplary network architecture where manual DNS configuration is required for self-constructed FQDNs of 5GC NFs.

In the current 3GPP-defined architecture for 5G, there is no mechanism for automatic DNS configuration for self-constructed FQDNs of 5G NFs. FIG. 4 is a network diagram illustrating an exemplary network architecture where manual DNS configuration is required for self-constructed FQDNs of 5GC NFs. Referring to FIG. 4, the network includes a visited PLMN and a home PLMN. The visited PLMN includes visited SEPP 126A, visited NRF 100A, visited NSSF 116A, SMSF 400, gNodeB 402, SMF 108, N3IWF 404, and AMF 110. The visited PLMN further includes visited PLMN DNS 406A. The home PLMN includes home SEPP 126B, home NRF 1008, home NSSF 116B, and home PLMN DNS 406B. The NFs in the home and visited PLMNs self-construct FQDNs to identify and communicate with each other. The IP addresses associated with the self-constructed FQDNs can change frequently. Because there is no automatic DNS configuration procedure defined in the 3GPP standards, manual configuration of DNS 406A and 406B is required to maintain up to date mappings between self-constructed FQDNs of the 5GC NFs and IP addresses Table 1 shown below illustrates some examples where self-constructed FQDNs can be used in the architecture of FIG. 4.

TABLE 1

Self-Constructed FQDN Usage Examples

| Producer | Consumer | Comments |
|---|---|---|
| H-NRF | V-NRF/H-SEPP | V-NRF sends an SBI request to the H-NRF using a self-constructed FQDN of the H-NRF via SEPPs. The H-SEPP has to query DNS to resolve the H-NRF FQDN. |
| AMF, AMF Set, AMF instance | gNodeB | The gNodeB is required to query DNS to resolve the self-constructed FQDN for an AMF set, an AMF, and/or AMF instance. |
| NSSF | V-NSSF/H-SEPP, AMF | The V-NSSF sends an SBI request to the H-NSSF using a self-constructed FQDN of the H-NSSF via SEPPs. The H-SEPP is required to query DNS to resolve the H-NSSF FQDN. The AMF self-constructs the NSSF FQDN and resolves it using DNS in the absence of local configuration. |
| PLMN level NRF | All 5GC NFs | The NF self-constructs the PLMN level NRF FQDN and resolves the FQDN using DNS in the absence of local configuration. |

In each of the scenarios in Table 1, the NF that receives a message with a self-constructed FQDN of the target NF is required to query DNS to obtain the IP address of the target. Accordingly, it is desirable to have an efficient mechanism to keep DNS records for self-constructed FQDNs up to date that avoids or at least reduces the need for manual DNS configuration.

Figure 5:
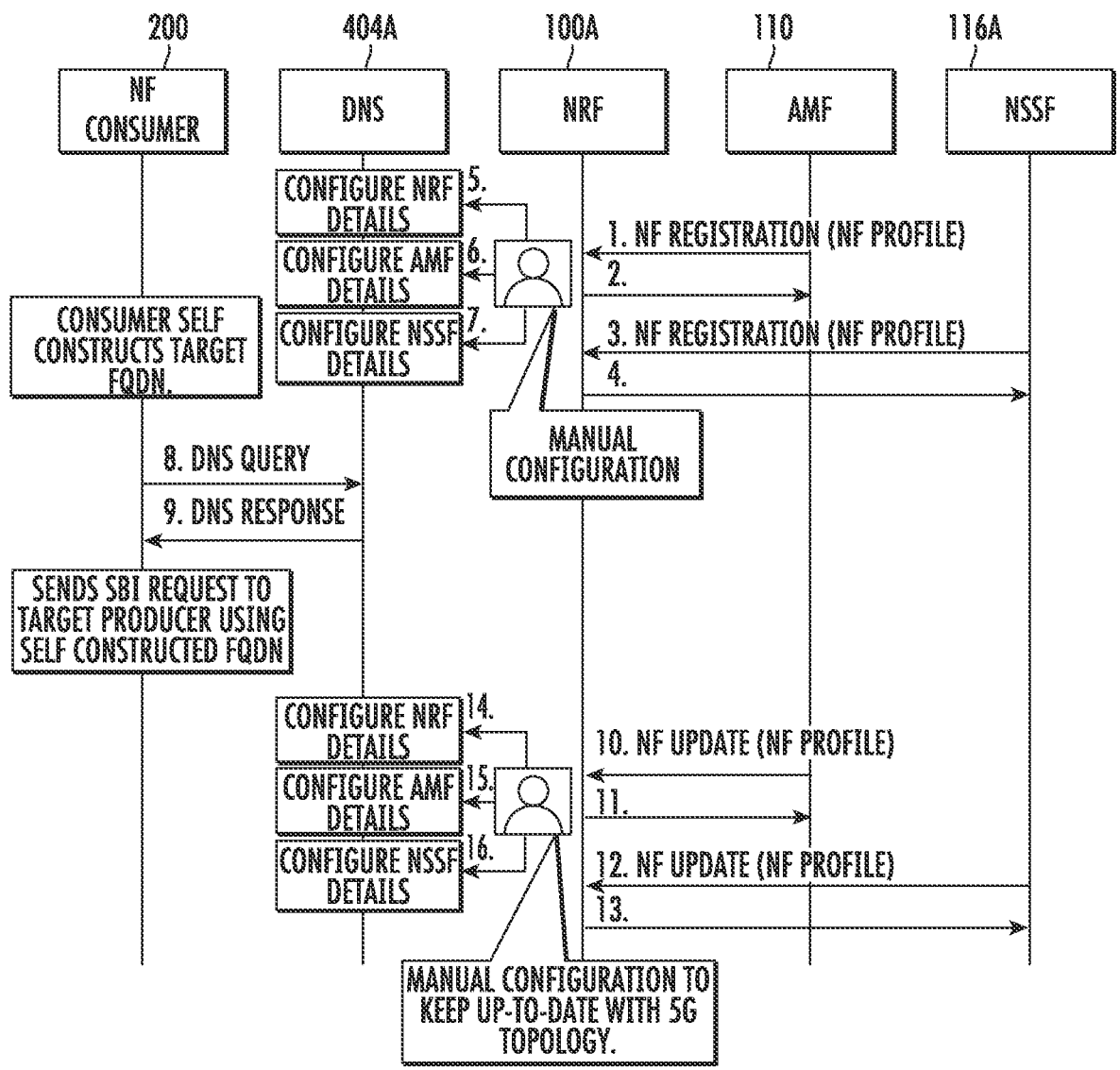
FIG. 5 is a message flow diagram illustrating exemplary messages exchanged in a network where manual DNS configuration is performed for self-constructed FQDNs of 5GC NFs.

FIG. 5 is a message flow diagram illustrating exemplary messages exchanged in a network where manual DNS configuration is performed for self-constructed FQDNs of 5GC NFs. Referring to FIG. 5, when an NF registers its NF or service profile with NRF 100A, it is necessary to manually configure DNS 406A with the mapping between the self-constructed FQDN for the NF and the IP address. A similar operation occurs when an NF updates its profile with the NRF. The NRF DNS configuration must also be maintained with DNS 406A. Referring to the message flow in FIG. 5, in lines 1 and 2, AMF 110 registers its NF profile with NRF 100A, and NRF 100A responds indicating successful registration of the NF profile of AMF 110. In line 3, NSSF 116A sends an NF register message to NRF 100A. In line 4, NRF 100A responds with a success message indicating successful registration of NSSF 116A. After line 4, or any time a registration is performed with NRF 100A, DNS 406A must be configured with the self-constructed FQDN of the NF whose NF or service profile is being registered and the corresponding IP address. In line 5, DNS 406A is manually configured with the IP address and self-constructed FQDN of NRF 100A. In line 6, DNS 406A is manually configured with the self-constructed FQDN and IP address of AMF 110. In line 7, DNS 406A is manually configured with the self-constructed FQDN and IP address of NSSF 116A.

When a consumer NF seeks to communicate with a target NF, the consumer NF self-constructs the FQDN of the target NF according to the format defined in 3GPP TS 23.003. Because the consumer NF 200 does not know the IP address corresponding to the FQDN, either the consumer NF or an SCP or SEPP must send the DNS query to DNS 406A to resolve the FQDN into an IP address. In line 9, consumer NF 200 receives a response to the DNS query containing the mapping between the FQDN and the IP address. After line 9, consumer NF 200 can send a message to the target producer NF using the self-constructed FQDN and the IP address obtained from DNS 406A.

In line 10 of the message flow diagram, AMF 110 sends an NF update message to NRF 100A to update the NF profile of AMF 110 with NRF 100A. In line 11, NRF 100A responds with a success message indicating that the NF update service operation was successful. In line 12, NSSF 116A sends a message to NRF 100A to update the NF profile of NSSF 116A with NRF 100A. In line 13, NRF 100A responds with a success message indicating that the NF update operation was successful. After line 13, DNS 406A must be manually configured with any changes in the IP address mappings for NRF 100A, AMF 110, and NSSF 116A. In line 14, DNS 406A is manually configured with the updated IP address mapping information for NRF 100A. In line 15, DNS 406A is manually configured with the updated IP address mapping information for AMF 110. In line 16, DNS 406A is manually configured with the updated IP address mapping information of NSSF 116A.

Figure 6:
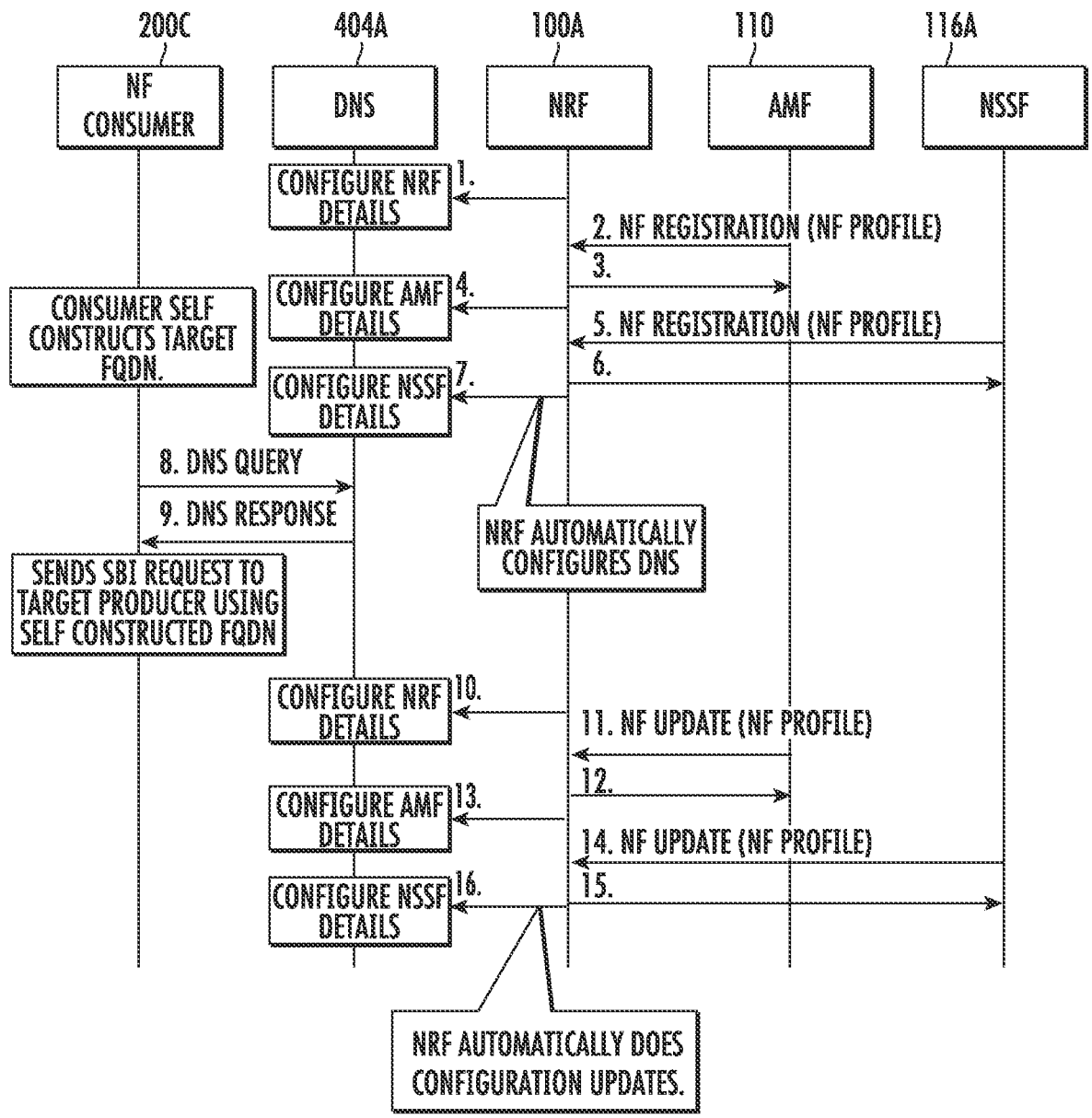
FIG. 6 is a message flow diagram illustrating exemplary messages exchanged when an NRF performs automatic DNS configuration for 5GC NFs.

In order to avoid or reduce the need for manual DNS configuration after each NF registration and/or NF update, the subject matter described herein adds functionality to the NRF to automatically configure DNS when a message concerning a 5G NF is received. FIG. 6 is a message flow diagram illustrating exemplary messages exchanged when an NRF performs automatic DNS configuration for self-constructed FQDNs of 5GC NFs. In line 1, NRF 100A automatically configures its FQDN to IP address mapping with DNS 406A. NRF 100A may automatically update its FQDN to IP address mapping with DNS 406A at boot up of NRF 100A or any time the IP address of NRF 100A changes.

When an NF registers or updates its NF or service profile with NRF 100A, it is no longer necessary to manually configure DNS 406A with the mapping between the self-constructed FQDN for the NF and the IP address. In line 2, AMF 110 registers its NF profile with NRF 100A, and, in line 3, NRF 100A responds indicating successful registration of the NF profile of AMF 110. In line 4, in response to registering the NF profile of AMF 110, NRF 100A automatically configures DNS 406A with the mapping between the self-constructed FQDN of AMF 110 and the IP address corresponding to the self-constructed FQDN. If the IP address and the self-constructed FQDN are both in the NF profile, NRF 100A may read the self-constructed FQDN and the IP address from the NF profile and use the self-constructed FQDN and the IP address in a message that NRF 100A transmits to a DNS server that is part of DNS 406A. The format of the message that NRF 100A transmits to the DNS server depends on the application programming interface (API) used by the DNS server in the region where the mapping is being updated. If the IP address is not in the NF profile, NRF 100A may obtain the IP address by querying another source, such as a load balancer, a cloud network service registry, a local DNS cache, or other source.

In line 5, NSSF 116A sends an NF register message to NRF 100A. In line 6, NRF 100A responds with a success message indicating successful registration of NSSF 116A. In line 7, NRF 100A automatically configures DNS 406A with the mapping between the self-constructed FQDN of NSSF 116A and the IP address corresponding to the self-constructed FQDN. As with the case with AMF 110, NRF 100A may obtain the IP address from the NF or service profile of NSSF 116A or from another source, such as a load balancer, a local DNS cache, or a cloud network service registry.

When a consumer NF seeks to communicate with a target NF, the consumer NF self-constructs the FQDN of the target NF according to the format defined in 3GPP TS 23.003. Because the consumer NF 200 does not know the IP address corresponding to the FQDN, either the consumer NF or an SCP or SEPP must send the DNS query to DNS 4046A to resolve the FQDN into an IP address. In line 9, consumer NF 200 receives a response to the DNS query containing the mapping between the FQDN and the IP address. After line 9, consumer NF 200 can send a message to the target producer NF using the self-constructed FQDN and the IP address obtained from DNS 406A. Because DNS records for producer NFs are maintained by NRF 100A, manual DNS configuration is not required, and consumer NF 200 will receive an IP address for the self-constructed FQDN that is synchronized with the IP address mapping data available to NRF 100A.

In line 10 of the message flow diagram, NRF 100A configures its IP address mapping information with DNS 406A. As described above, NRF 100A may automatically update the IP address corresponding to the self-constructed FQDN of NRF 100A any time the IP address changes, e.g., due to a change in cloud network resource allocations.

In line 11 of the message flow diagram, AMF 110 sends an NF update message to NRF 100A to update the NF profile of AMF 110 with NRF 100A. In line 12, NRF 100A responds with a success message indicating that the NF update service operation was successful. In line 13, NRF 100A automatically configures DNS 406A with the mapping between the self-constructed FQDN of AMF 110 and the IP address corresponding to the self-constructed FQDN.

In line 14, NSSF 116A sends an NF update message to NRF 100A to update the NF profile of NSSF 116A with NRF 100A. In line 15, NRF 100A responds with a success message indicating that the NF update operation was successful. In line 16, NRF 100A automatically configures DNS 406A with the mapping between the self-constructed FQDN of NSSF 116A and the IP address corresponding to the self-constructed FQDN.

Figure 7:
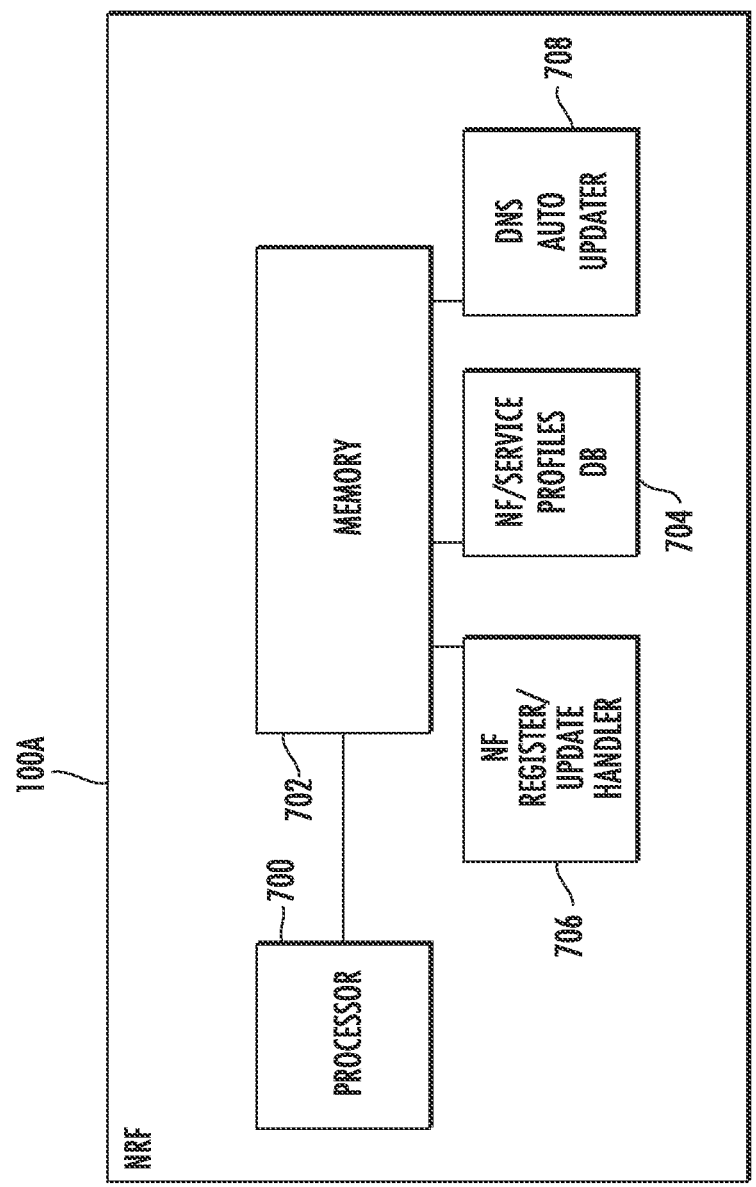
FIG. 7 is a block diagram illustrating an exemplary architecture for an NRF for performing automatic DNS configuration for 5GC NFs.

FIG. 7 is a block diagram illustrating an exemplary architecture for an NRF for performing automatic DNS configuration for self-constructed FQDNs of 5GC NFs. Referring to FIG. 7, NRF 100A includes at least one processor 700 and memory 702. NRF 100A further includes and NF/service profiles database 704 that may reside in memory 702. NF/service profiles database 704 stores the NF and service profiles of NF that are registered with NRF 100A. NRF 100A further includes an NF register/update handler 706 that receives and processes NF register and update messages to store and update NF profiles and NF service profiles in NF/service profiles database 704.

NRF 100A further includes a DNS auto updater 708 that automatically configures DNS in response to detecting changes in mappings between self-constructed FQDNs of NFs and IP addresses and other types of DNS mappings. DNS auto updater 708 may update DNS records in response to receiving and NF register message or an NF update message from a consumer NF. NF register/update handler 706 and DNS auto updater 708 may be implemented using computer executable instructions stored in memory 702 and executable by processor 700.

DNS auto updater 708 may interface with DNS using an API provided by DNS in the particular network in which DNS auto updater 708 resides. NRF 100A may be configured with the following attributes of the API to allow DNS auto updater 708 to interface with DNS:

TABLE 2

DNS Configuration Attributes at NRF

| Attribute Name | Description |
|---|---|
| DNS API endpoint | DNS configuration API endpoint, i.e., FQDN |
| DNS API prefix | DNS configuration API prefix |
| DNS security credentials | Security credentials to access DNS |

In Table 2, the value of the DNS API endpoint attribute is the FQDN of the DNS server that the NRF contacts to update DNS records. The value of the DNS API prefix attribute is a prefix to the FQDN of the DNS server that the NRF contacts to update DNS records. The value(s) of the DNS security credentials attribute includes any security credentials that are required for the DNS server to allow the NRF to update DNS records for 5GC NFs.

Figure 8:
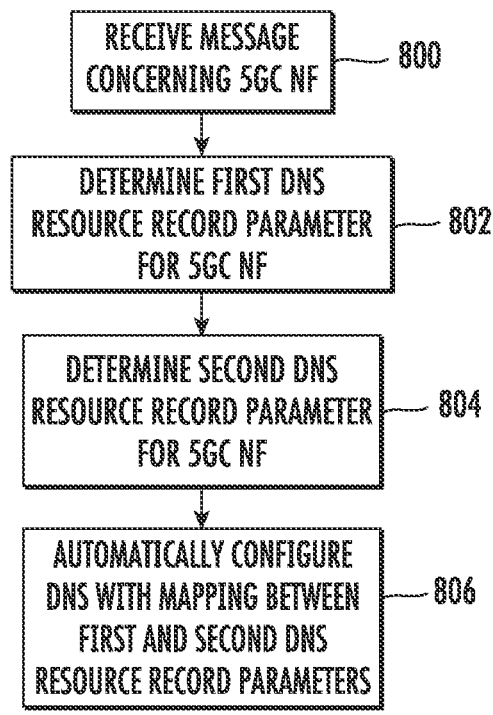
FIG. 8 is a flow chart illustrating an exemplary process for performing automatic DNS configuration for 5GC NFs.

FIG. 8 is a flow chart illustrating an exemplary process for performing automatic DNS configuration for self-constructed FQDNs of 5GC NFs. referring to FIG. 8, in step 800, the process includes receiving a message concerning a 5GC NF. For example, DNS auto updater 708 of NRF 101A may receive an NF register request or an NF update request for registering or updating an NF or service profile of NRF 100A.

In step 802, the process includes determining a first DNS resource record parameter for the 5GC NF. For example, DNS auto updater 708 of NRF 100A may read the self-constructed FQDN from the NF or service profile if the FQDN is present in the NF or service profile. Alternatively, NRF 100A may self-construct the FQDN of the 5GC NF using parameters available in the NF or service profile. In another example, NRF 100A may read or construct a uniform resource name (URN) from the NF or service profile of the 5GC NF.

In step 804, the process includes determining a second DNS resource record parameter for the 5GC NF. For example, DNS auto updater 708 of NRF 100A may read the IP address from the NF or service profile received in the NF register or NF update message if the IP address is present in the NF or service profile. Alternatively, DNS auto updater 708 of NRF 100A may determine the IP address corresponding to the FQDN from an external source, such as a load balancer, a cloud network service registry, or a local DNS server or cache.

In step 806, the process includes automatically configuring DNS with a mapping between the first and second DNS resource record parameters. For example, DNS auto updater 708 of NRF 100A may transmit a message to a DNS server to update a DNS record for the 5GC NF to include a mapping between a self-constructed FQDN of the 5GC NF and an IP address of the NF. In another example, DNS auto updater 708 may generate a naming authority pointer record (NAPTR) record for the 5GC NF and transmit the NAPTR record to a DNS server. The following is an example of an NAPTR record that may be generated by DNS auto updater 708 using parameters from an NF profile of a 5GC NF:

```
; AMF Set 1 of AMF Region 48
set001.region48.amfset
; IN NAPTR order pref. flag service            regexp replacement
  IN NAPTR 100  999   "a"  "x-3gpp-amf:x-n2"  ""  topoff.amf11.amf
  IN NAPTR 100  999   "a"  "x-3gpp-amf:x-n"   ""  topoff.amf12.amf
```

In the example, the NAPTR record includes the AMF set FQDN, set001.region48.amfset, and the NF instance FQDNs, topoff.amf11.amf and topoff.amf12.amf, of the AMFs that are members of the AMF set. The lines that begin with a semicolon are comments. DNS auto updater 708 may generate the NAPTR record content using FQDNs and IP addresses extracted from the NF profile for the NF set.

In one example, DNS auto updater 708 may keep or maintain a local DNS cache of mappings between FQDNs of 5GC NFs and IP addresses, and, prior to sending a message to DNS, check the cache to determine whether the DNS record requires updating. If the IP address received or determined from an NF register or NF update message is a new or updated IP address for the self-constructed FQDN of the 5GC NF, DNS auto updater 708 may transmit the message to the DNS server to update the mapping between the IP address and the self-constructed FQDN maintained by the DNS server. If the IP address received in or determined from an NF register or NF update message is not a new IP address for the self-constructed FQDN, DNS auto updater 708 may refrain from updating the DNS record with the DNS server.

Exemplary advantages of the subject matter described herein include automation of DNS configuration for on-demand topology changes (e.g. network slice additions/deletions/updates that result in a change in IP address for a self-constructed FQDN or other mappings maintained by DNS. In general the NRF as described herein obtain NF topology information from NF and service profiles of 5GC NFs and uses the NF topology information to automatically update DNS resource records for the 5GC NFs. The dynamic nature of the cloud native topology, which changes very frequently, will benefit from automatic updating of DNS records, as manual changes cannot keep up with the pace of topology changes. DNS details for self-constructed and other FQDNs do not need to be configured manually. Mappings between IP addresses and FQDNs of 5GC NFs can be synced by the NRF, which operates in both the 5GC and DNS systems. For example, local DNS configuration maintained by the NRF can be synced to an external DNS. Implementing automatic DNS configuration using the NRF reduces implementation complexities. Only the NRF is required to implement DNS configuration. As new NF register and NF update messages are received, the DNS configuration maintained by the NRF is continuously audited for changes. When a change in IP address is detected, the NRF automatically populates the change to the DNS.

The disclosure of each of the following references is incorporated herein by reference in its entirety.

REFERENCES 1. 3$^{rd}$ Generation Partnership Project; Technical Specification Group Core Network and Terminals; Numbering, addressing and identification; (Release 17) 3GPP TS 23.003 V17.3.0 (2021-09)

2. 3rd Generation Partnership Project; Technical Specification Group Core Network and Terminals; Technical Realization of Service Based Architecture (5GS); Stage 3 (Release 17) 3GPP TS 29.500 V17.4.0 (2021-09)
3. 3rd Generation Partnership Project; Technical Specification Group Services and System Aspects; System Architecture for the 5G System (5GS); Stage 2 (Release 17) 3GPP TS 23.501 V17.2.0 (2021-09)
4. 3rd Generation Partnership Project; Technical Specification Group Services and System Aspects; Procedures for the 5G System (5GS); Stage 2 (Release 17) 3GPP TS 23.502 V17.2.1 (2021-09)
5. 3rd Generation Partnership Project; Technical Specification Group Croup Core Network and Terminals; Principles and Guidelines for Services Definitions; Stage 3 (Release 17) 3GPP TS 29.501 V17.3.1 (2021-09)
6. 3rd Generation Partnership Project; Technical Specification Group Core Network and Terminals; 5G System; Network Function Repository Services; Stage 3 (Release 17) 3GPP TS 29.510 V17.3.0 (2021-09)
7. 3rd Generation Partnership Project; Technical Specification Group Services and System Aspects; Security architecture and procedures for 5G System (5GS) (Release 17) 3GPP TS 33.501 V17.3.0 (2021-09)
8. 3rd Generation Partnership Project; Technical Specification Group Core Network and Terminals; Domain Name System Procedures (Release 17) 3GPP TS 29.303 V17.0 (2021-03)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for automatic domain name system (DNS) configuration for 5G core (5GC) network functions (NFs), the method comprising:
    at an NF repository function (NRF) including at least one processor:
        receiving a message concerning a 5GC network function, wherein the message comprises an NF register or NF update message including an NF or service profile of the 5GC NF;
        determining a first DNS resource record parameter for the 5GC NF, wherein determining the first DNS resource record parameter comprises determining, from the NF or service profile, a self-constructed fully qualified domain name (FQDN) for the 5GC NF;
        determining a second DNS resource record parameter for the 5GC NF, wherein determining the second resource record parameter comprises determining, from the NF or service profile, an Internet protocol (IP) address for the 5GC NF;
        maintaining, at the NRF, a local DNS cache of mappings between FQDNs of 5GC NFs and IP addresses;
        checking, by the NRF, the local DNScache maintained by the NRF to determine whether a DNS record for the 5GC NF maintained by a DNS server separate from the NRF requires updating, wherein checking the local DNS cache includes checking the cache to determine whether the IP address from the NF or service profile represents a new or updated IP address for the 5GC NF;
        in response to determining that the IP address from the NF or service profile represents a new or updated IP address for the 5GC NF, automatically configuring the DNS server with a mapping between the self-constructed FQDN for the 5GC NF and the new or updated IP address for the 5GC NF; and
        in response to determining that the IP address from the NF or service profile does not represent a new or updated IP address for the 5GC NF, refraining from automatically configuring the DNS server with the mapping between the self-constructed FQDN for the 5GC NF and the new or updated IP address for the 5GC NF.

2. The method of claim 1 wherein determining the first DNS resource record parameter comprising the self-constructed FQDN includes reading the self-constructed FQDN of the 5GC NF from the NF or service profile of the 5GC NF.

3. The method of claim 1 wherein determining the first DNS resource record parameter comprising the self-constructed FQDN includes creating the self-constructed FQDN from parameters in the NF or service profile of the 5GC NF.

4. The method of claim 1 wherein determining the IP address from the NF or service profile of the 5GC NF includes reading the IP address from the NF or service profile of the 5GC NF.

5. The method of claim 1 wherein determining the first DNS resource record parameter comprising the self-constructed FQDN includes reading an NF set FQDN and the self-constructed FQDN from the NF profile of the NF and wherein automatically configuring the DNS includes automatically generating a naming authority pointer (NAPTR) record mapping the NF set FQDN to the self-constructed FQDN.

6. The method of claim 1 wherein automatically configuring the DNS server comprises transmitting, from the NRF to the DNS server, a message formatted according to an application programming interface (API) published by the DNS server and including the mapping between the first and second DNS resource record parameters.

7. The method of claim 1 wherein determining first and second DNS resource record parameters includes determining the first and second DNS resource record parameters from the service profile.

8. The method of claim 1 comprising automatically updating the DNS resource record with a value of a port attribute from the service profile.

9. A system for automatic domain name system (DNS) configuration for 5G core (5GC) network functions (NFs), the system comprising:
    a network function (NF) repository function (NRF) including at least one processor and a memory comprising a non-transitory computer readable medium; and
    a DNS auto updater implemented by the at least one processor for receiving an NF register or NF update message concerning a 5GC network function and including an NF or service profile for the 5GC NF, determining, from the NF or service profile, a first DNS resource record parameter for the 5GC NF and a second DNS resource record parameter the 5GC NF, wherein the first DNS resource record parameter comprises a self-constructed fully qualified domain name (FQDN) for the 5GC NF, the second DNS resource record parameter comprises an Internet protocol (IP) address for the 5GC NF, and the DNS auto updater is configured for:

maintaining, at the NRF, a local DNS cache of mappings between FQDNs for 5GC NFs and IP addresses;

checking the local DNS cache maintained by the NRF to determine whether a DNS record for the 5GC NF maintained by a DNS server separate from the NRF requires updating, wherein checking the local DNS cache includes checking the cache to determine whether the IP address from the NF or service profile represents a new or updated IP address for the 5GC NF and, in response to determining that the IP address from the NF or service profile represents a new or updated IP address for the 5GC NF, automatically configuring the DNS server with a mapping between the self-constructed FQDN for the 5GC NF and the IP address; and in response to determining that the IP address from the NF or service profile does not represent a new or updated IP address for the 5GC NF, refraining from automatically configuring the DNS server with the mapping between the self-constructed FQDN for the 5GC NF and the IP address for the 5GC NF.

10. The system of claim 9 wherein the DNS auto updater is configured to determine the first DNS resource record parameter comprising an FQDN by reading the self-constructed FQDN of the 5GC NF from the NF or service profile of the 5GC NF.

11. The system of claim 9 wherein the DNS auto updater is configured to determine the first DNS resource record parameter comprising the self-constructed FQDN by creating the self-constructed FQDN of the 5GC NF from parameters in the NF or service profile of the 5GC NF.

12. The system of claim 9 wherein the DNS auto updater is configured to determine the second DNS resource record parameter comprising the IP address by reading the IP address from the NF or service profile of the 5GC NF.

13. The system of claim 9 wherein the DNS auto updater is configured to determine the first DNS resource record parameter comprising the self-constructed FQDN by reading an NF set FQDN and the self-constructed FQDN from the NF profile of the NF and to automatically configure the DNS server by automatically generating a naming authority pointer (NAPTR) record mapping the NF set FQDN to the self-constructed FQDN.

14. The system of claim 9 wherein the DNS auto updater automatically configures the DNS server by transmitting, from the NRF to the DNS server, a message formatted according to an application programming interface (API) published by the DNS server and including the mapping between the first and second DNS resource record parameters.

15. The system of claim 9 wherein the DNS auto updater is configured to determine the first and second DNS resource record parameters from the service profile.

16. The system of claim 9 wherein the DNS auto updater is configured to automatically update the DNS resource record with a value of a port attribute from the service profile.

17. One or more non-transitory computer readable media having stored thereon executable instructions that when executed by a processor of a network function (NF) repository function (NRF) control the NRF to perform steps comprising:

receiving a message concerning a 5GC network function, wherein the message comprises an NF register or NF update message including an NF or service profile of the 5GC NF;

determining a first DNS resource record parameter for the 5GC NF, wherein determining the first DNS resource record parameter comprises determining, from the NF or service profile, a self-constructed fully qualified domain name (FQDN) for the 5GC NF;

determining a second DNS resource record parameter for the 5GC NF, wherein the second resource record parameter comprises an Internet protocol (IP) address for the 5GC NF;

maintaining, at the NRF, a local DNS cache of mappings between FQDNs of 5GC NFs and IP addresses;

checking, by the NRF, the local DNScache maintained by the NRF to determine whether a DNS record maintained by a DNS server separate from the NRF for the 5GC NF requires updating, wherein checking the local DNS cache includes checking the cache to determine whether the IP address from the NF or service profile represents a new or updated IP address for the 5GC NF;

in response to determining that the IP address from the NF or service profile represents a new or updated IP address for the 5GC NF, automatically configuring a DNS server with a mapping between the self-constructed FQDN for the 5GC NF and the IP address for the 5GC NF; and in response to determining that the IP address from the NF or service profile does not represent a new or updated IP address for the 5GC NF, refraining from automatically configuring the DNS server with the mapping between the self-constructed FQDN for the 5GC NF and the IP address for the 5GC NF.

18. The one or more non-transitory computer readable media of claim 17 wherein determining first and second DNS resource record parameters includes determining the first and second DNS resource record parameters from the service profile.

19. The one or more non-transitory computer readable media of claim 17 wherein the computer-executable instructions are configured to control the processor of the NRF to automatically update the DNS resource record with a value of a port attribute from the service profile.

* * * * *